(12) United States Patent
Gamroth et al.

(10) Patent No.: US 7,781,735 B2
(45) Date of Patent: Aug. 24, 2010

(54) SUN DETECTION SENSOR

(76) Inventors: Virgil J. Gamroth, 5301 Longley La. D-154, Reno, NV (US) 89511; Ernest Cameron, 5301 Longley La. D-154, Reno, NV (US) 89511

( * ) Notice: Subject to any disclaimer, the term of this patent is extended or adjusted under 35 U.S.C. 154(b) by 0 days.

(21) Appl. No.: 11/973,041

(22) Filed: Oct. 4, 2007

(65) Prior Publication Data

US 2009/0114821 A1    May 7, 2009

(51) Int. Cl.
*G01J 5/00* (2006.01)

(52) U.S. Cl. .................... 250/338.1; 250/332

(58) Field of Classification Search ............ 250/201.1, 250/208.4, 354.1, 333, 339.01, 338.1, 505.1; 374/132, 133, 130, 131, 121, 120, 141, 142
See application file for complete search history.

(56) References Cited

U.S. PATENT DOCUMENTS

| | | |
|---|---|---|
| 3,940,753 A | 2/1976 | Muller |
| 4,063,096 A | 12/1977 | Roberts |
| 4,146,784 A | 3/1979 | Yekutielli |
| 4,209,699 A | 6/1980 | Pusch |
| 4,318,089 A | 3/1982 | Frankel et al. |
| 4,349,733 A | 9/1982 | Beam et al. |
| 4,701,624 A | 10/1987 | Kera et al. |
| 4,710,630 A | 12/1987 | Kuppenhimer, Jr. et al. |
| 4,731,881 A | 3/1988 | Geller |
| 4,737,028 A | 4/1988 | Smith |
| 4,791,297 A | 12/1988 | Savoca et al. |
| 4,849,620 A | 7/1989 | Guerin et al. |
| 5,001,348 A | 3/1991 | Dircherl et al. |
| 5,335,060 A * | 8/1994 | Gentile et al. ............ 356/213 |
| 5,638,599 A * | 6/1997 | Beratan et al. ............ 29/854 |
| 5,867,313 A * | 2/1999 | Schweitzer et al. ........ 359/418 |
| 5,990,481 A | 11/1999 | Beratan |
| 6,088,165 A * | 7/2000 | Janeczko et al. .......... 359/629 |
| 6,373,628 B1 * | 4/2002 | Gunnarsson et al. ....... 359/428 |
| 7,484,885 B1 * | 2/2009 | Carlson et al. ........... 374/132 |
| 2006/0055820 A1 * | 3/2006 | Lyon et al. .............. 348/373 |
| 2007/0080306 A1 | 4/2007 | Lin |
| 2008/0017784 A1 | 1/2008 | Hoot et al. |

OTHER PUBLICATIONS

"AimPoint Comp M3", [Mar. 19, 2006], Retrieved from the Internet [Aug. 25, 2008], Retrieved from URL<http://www.opticshq.com/page/Optics/PROD/COMPM3>.*

"Plastic Silicon Infrared Phototransistor" Fairchild Semiconductor [Jul. 20, 2002], Retrieved from the Internet [Aug. 25, 2008], Retrieved from URL <http://www.fairchildsemi.com>.*

Hecht, E., "Infrared", Optics, 4th 3d., Adelphi Univ. Published 2002, p. 76.*

* cited by examiner

*Primary Examiner*—David P Porta
*Assistant Examiner*—Yara B Green
(74) *Attorney, Agent, or Firm*—Gerald D. Haynes

(57) ABSTRACT

A sun detection sensor assembly for attachment to a thermal imaging device, comprising an elongated tubular body having two ends and a sensor, characterized as Sun TECT sensor, attached to one end, the Sun TECT sensor having a tubular body, an IR window positioned at one end of the tubular body, and a photo a infrared photo transistor positioned within the tubular body, opposite the IR window, the infrared photo transistor having a photo sensitive surface for detecting the exposure from sun when the sun is within a field of view of the Sun TECT Sensor, and an automatic ON/OFF mechanism which is activated by the infrared photo transistor and protecting the thermal imaging device from undesired and harmful infrared radiation.

15 Claims, 2 Drawing Sheets

SUN DETECTION SENSOR

BACKGROUND OF THE INVENTION

1. Field of the Invention

The present invention is generally related to sun detection sensor systems, and particularly to sun detection sensors that protect critical components of infrared cameras and other thermal imaging devices from accidental exposure from direct sunlight. The critical components include Sensors made of materials including amorphous silicon or vanadium oxide, which are ordinarily used in uncooled Infrared Cameras.

2. Description of the Related Art

Thermal imaging devices such as infrared cameras are used for detecting and imaging objects which emit an infrared signal generated by their hot body or exhaust signature. For example, they can be employed to detect fires, overheating machinery, airplanes, vehicles and people and to control temperature sensitive industrial processes. Thermal imaging devices operate by detecting the differences in thermal radiance of various objects in a scene and by displaying the differences as a visual image of the scene. Thermal imaging devices include optics for collecting and focusing thermal radiation from a scene, a thermal detector having several thermal sensors for converting thermal radiation to an electrical signal and electronics for amplifying and processing the electrical signal into a visual display.

Infrared cameras are utilized during a wide range of environmental conditions, ranging from night time through bright sunny days. The sun as a black body produces intense radiation throughout the entire infrared band. Infrared cameras have great difficulty detecting targets, when the sun rays are directly in the field of view. The amount of solar radiation can be extremely large when compared to the radiation signals from the objects to be detected. In these instances, solar radiation is capable of saturating the infrared detector and damaging it. Additionally, solar radiation can reduce the sensitivity in a viewed scene thus producing a blurred image of the scene.

Infrared cameras can be broadly divided into two types: those with cooled infrared image detectors and those with uncooled infrared image detectors. Uncooled infrared cameras, use a detector which operates at an ambient temperature. Cooled infrared image detectors require bulky, expensive cryogenic coolers to operate.

Uncooled infrared cameras do not require cryogenic coolers because they do not need to be cooled to low temperatures. They are equipped with small temperature control elements which maintain the detector at about ambient temperature. All modern uncooled infrared cameras use detectors that work by the change in resistance, voltage, or current when heated by infrared radiation. These changes are measured and compared to the values of the operating temperature of the detector. The detectors of the uncooled infrared cameras can be stabilized at an ambient operating temperature to reduce image noise. Uncooled infrared cameras detectors comprise pyroelectric and ferroelectric materials that are designed based on microbolometer technology. These detectors are known as infrared microbolometer sensors, which are suited to operate at ambient temperatures.

Infrared detectors are generally made of vanadium oxide and amorphous silicon and are used as sensors in uncooled infrared cameras and other equipments which are likely to be damaged by exposure to direct sunlight.

It is known in the art to protect infrared detectors from potentially damaging exposure to direct sunlight. Optical filters can be used to eliminate or reduce saturation, blooming and/or damage to the equipment and imaging by the exposure to the sunlight. Many such filters are, however, inadequate in providing protection and may result in black or blurred scene image. Other electronic techniques are deficient because they can be affected by the large flux produced by radiation from the sunlight. It is therefore desirable to provide an apparatus and method for limiting the damage to infrared detectors caused by direct exposure to the sunlight. Accordingly, it is an object of our present invention to provide an apparatus and method to protect infrared cameras and other thermal imaging devices from the undesirable and damaging effects of exposure to direct sunlight.

It is another object of our invention to locate the sun detection sensor separately as a universal attachment to an XT infrared camera and away from the optic lens, to protect optic lens from the effects of undesired radiation.

It is further object of our invention to provide a simple and inexpensive attachment which is removably attached to the infrared camera. The attachment will be used only when there is possibility of getting undesired radiation.

SUMMARY OF THE INVENTION

In accordance with our invention, we provide a sun detection sensor assembly for attachment to a thermal imaging device, including: an elongated tubular body having two ends and a sensor, characterized as Sun TECT Sensor, attached to one end. The Sun TECT sensor includes a tubular body, an IR window positioned at one end of the tubular body, and a infrared photo transistor positioned within the tubular body, opposite the IR window. The infrared photo transistor includes a photo sensitive surface for detecting the exposure from sun when the sun is within a field of view of the Sun TECT Sensor; and an automatic ON/OFF mechanism which is activated by the infrared photo transistor. The infrared photo transistor, which is located at a preset distance from the IR window within the tubular body of the Sun TECT Sensor, when exposed to sunlight on the surface of the infrared photo transistor activates the ON/OFF mechanism and turns the thermal imaging device ON and OFF thus protecting the thermal imaging device from undesired and harmful infrared radiation.

In an alternative embodiment of our invention, we provide a method for protecting critical components of a thermal imaging device from exposure to direct sunlight, including the steps of: (a) providing a sun detection sensor assembly having an elongated tubular body with two ends, including an attachment at one end, the attachment characterized as Sun TECT Sensor, wherein the Sun TECT Sensor further includes an IR (infrared) window at one end, a phototransistor at the other end, and a connecting control circuit that includes an automatic ON/OFF mechanism; (b) positioning the sun detection sensor assembly away from the viewing lens of the thermal imaging device; (c) monitoring the exposure to the sunlight with the corresponding phototransistor having a infrared photo transistor associated with Sun TECT sensor; and (d) activating the automatic ON/OFF mechanism on receiving a signal from the infrared photo transistor.

DETAILED DESCRIPTION OF THE INVENTION

Figure 1:
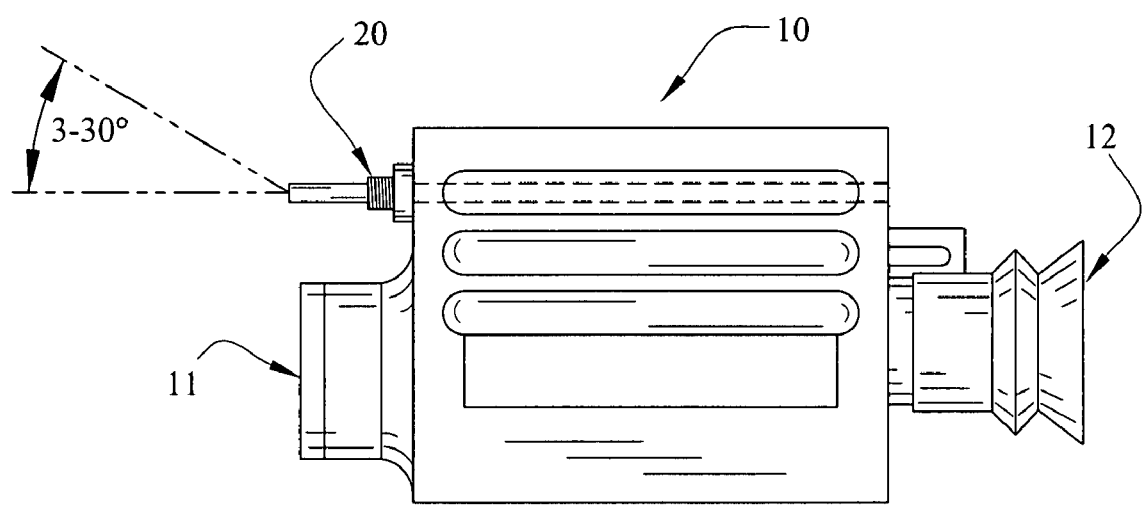
FIG. 1 illustrates an infrared camera according to an embodiment of our invention.

In accordance with our invention, we provide a sun detection sensor to sense and control the operation of a thermal imaging device by activating an ON/OFF switch. Referring to FIGS. 1-4 of the drawings wherein we designate identical parts and components by the same reference numerals throughout the specification. FIG. 1 illustrates an XT infrared camera 10 comprising an adjustable optic lens 12, a sighting eye piece 11, and a sun detection sensor assembly 20 removably attached to the body of the infrared camera 10, preferably an XT Infrared Camera.

Figure 2:
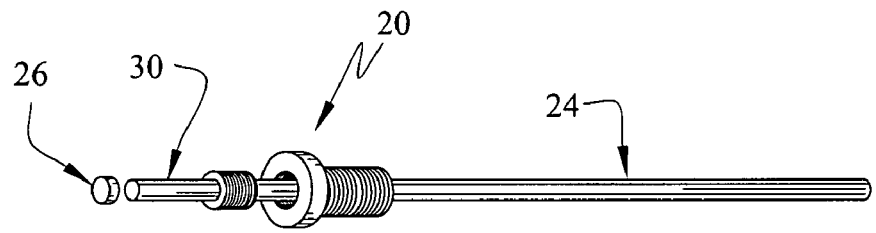
FIG. 2 illustrates a sun detection sensor assembly according an embodiment of our invention.

Now referring to FIG. 2, we illustrate a universal sun detection sensor assembly 20, comprising a hollow tube 24 including a sensor 30 and infrared or IR window 26 at one end. We fabricate the sun detection sensor assembly from black anodized aluminum, including fittings for attachment to the infrared camera 10. The black anodized aluminum protects the sensitive components and of the camera from the undesired radiation from exposure to the sunlight.

Figure 3:
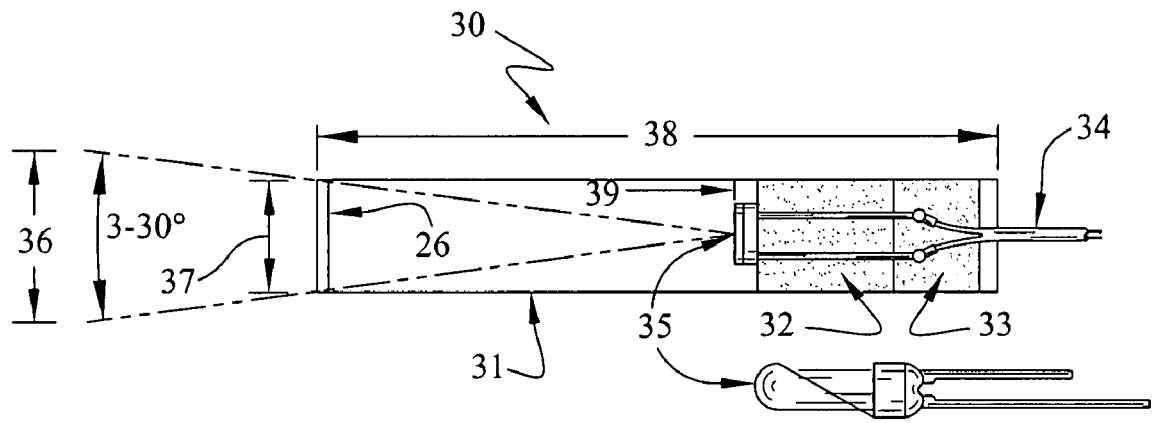
FIG. 3 illustrates a Sun TECT Sensor of the sun detection sensor assembly according to a preferred embodiment of our invention.

Now referring to FIG. 3, we illustrate the sun sensor, which we characterize as a "Sun TECT Sensor 30. The Sun TECT Sensor 30 comprises a housing 31 that includes a hollow tube 38 ranging in length from about $\frac{1}{8}^{th}$ inch to 2.0 inches, preferably about one inch. Tube 38 has an opening 37 at one end of the tube 38, the opening 37 having a diameter ranging from about 1.0 to 7.0 mm, preferably about 5 mm for a for a variable field of view (F.O.V.) that ranged from about 3 to 30 degrees. Tube 38 comprises an infrared or IR window 26 that is fitted to opening 37 for viewing the scene 36. The Sun TECT Sensor housing 31 also includes a silicon NPN phototransistor 35, position inside the tube 38 for the detection of the sunlight. The setback distance 39 determines the F.O.V. of the scene 36 at the phototransistor 35 of the Sun TECT Sensor 30. The F.O.V., ranging between about 3 and 30 degrees determines the preset setback distance 39. The phototransistor 35 is held in the housing by a foam rubber 32 spacer and fixed into position by epoxy glue 33. The phototransistor 35 is connected to light figure twin flex connector by a pair of leads 34. The Sun TECT Sensor is provided with dual control.

Figure 4:
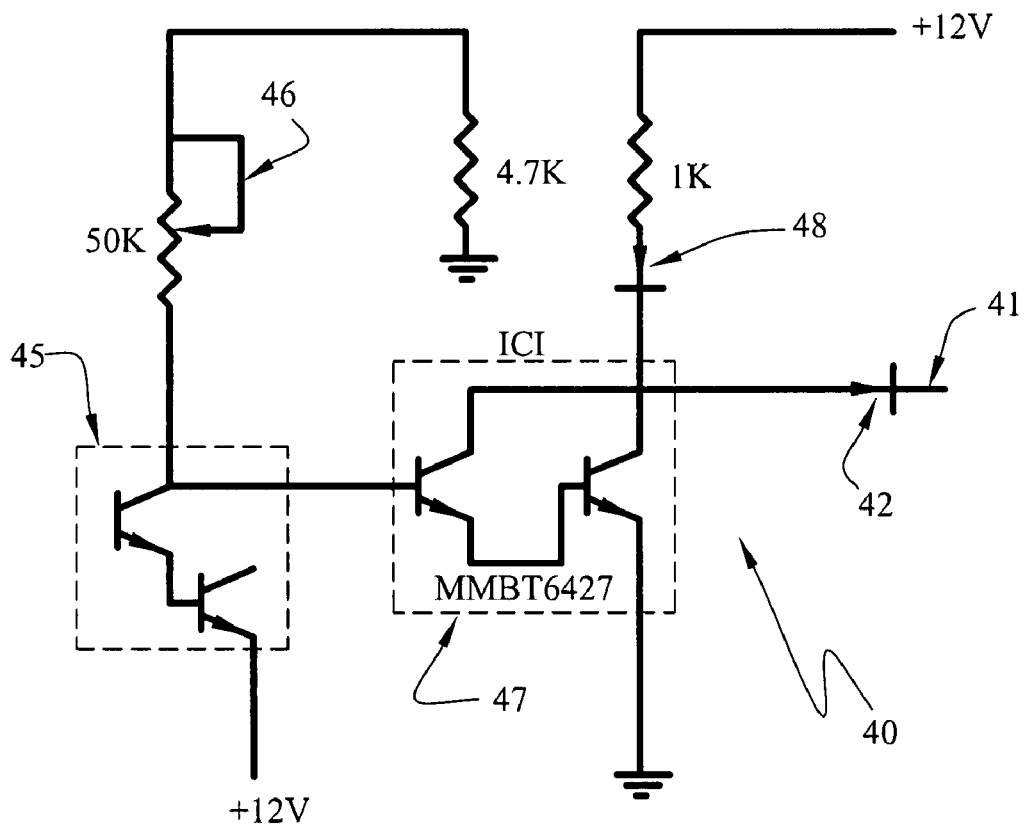
FIG. 4 illustrates a light sensing circuit which activates the ON/OFF switch according to an embodiment of our invention.

Now referring to FIG. 4, we illustrate a light sensing circuit 40, wherein the phototransistor 45 detects infrared energy of sun at 940 nm and supplies the turn on voltage to the Darlington Chip 47. Darlington Chip 47 controls the camera ON/OFF through the operation 41 which is activated through the reverse polarity detection diode 42. Once the Sun TECT sensor detects the infrared from sun at 940 nm (nanometer) it energizes the sensing circuit 40 to turn the IR camera 10 OFF. Also a circuit activation warning light 48 informs the operator that the camera has just been pointed into direct sunlight and to change the direction that the camera is pointed. The sensing circuit 40 also includes a sensitivity adjustment 46 which sets the threshold voltage for the Darlington Chip 47. Alternatively, a photodiode could be used in place of the phototransistor 45.

Having illustrated and described the principles of our invention in preferred embodiments thereof, it should be readily apparent to those skilled in the art that our invention can be modified in arrangement and detail without departing from such principles. We claim all modifications coming within the spirit and scope of the accompanying claims.

We claim:

1. A sun detection sensor assembly for attachment to a thermal imaging microbolometer device, comprising:
    an elongated tubular body having two ends a and sensor, characterized as Sun TECT Sensor, attached to one end;
    the Sun TECT Sensor having a tubular body, an IR window positioned at one end of the tubular body, and an infrared photo transistor positioned within the tubular body, opposite the IR window;
    the infrared photo transistor having a photosensitive surface for detecting radiant energy from the sun when the sun is within a field of view of the Sun TECT Sensor and comprises an electrical circuitry connected to a pair of electrical conductors extending from the back of the housing of the infrared photo transistor; and
    an automatic ON/OFF mechanism which is activated and deactivated by the infrared photo transistor;
    whereby the infrared photo transistor which is located at a preset distance from the IR window within the tubular body of the Sun TECT Sensor, wherein radiant energy from the sun is exposed to the surface of the infrared photo transistor and is converted into a signal that activated the ON/OFF mechanism and turns the thermal microbolometer imaging device ON and off thereby protecting the thermal imaging device from undesired and harmful radiation.

2. The Sun TECT Sensor according to claim 1, wherein the preset distance of the infrared photo transistor from the IR window is determined by the field of view of an angle chosen between 3 and 30 degrees.

3. The Sun TECT Sensor according to claim 1, wherein the infrared photo transistor is a photo transistor.

4. The Sun TECT Sensor according to claim 1, wherein the infrared photo transistor is a photo diode.

5. The sun detection sensor assembly of claim 1, wherein the assembly is fabricated from black anodized aluminum.

6. The electrical circuitry according to claim 1, wherein the circuitry being operative to detect a change in conductivity of the infrared photo transistor when the element is exposed to direct sunlight of an infrared wavelength of about 940 nm.

7. The electrical circuitry according to claim 6, wherein the circuitry connected to the electrical conductors extending from the back end of the infrared photo transistor, the circuitry being operative to detect a change in conductivity of the infrared photo transistor when exposed to direct sunlight or an infrared frequency having a wavelength of 940 nm.

8. The sun detection sensor assembly according to claim 1, wherein the assembly is a unit which can be easily attached or removed from the thermal imaging device as required.

9. The sun detection sensor assembly according to claim 1, wherein the assembly is fabricated of a material of low thermal conductivity.

10. The Sun TECT Sensor according to claim 1, further comprising an active warning light therein which alerts the operator that the thermal imaging device has just been pointed into direct sunlight and the operator to change the direction the device is pointed.

11. A method for protecting critical components of a thermal imaging microbolometer device from exposure to direct sunlight, the method steps comprising:
    providing a sun detection sensor assembly having an elongated tubular body with two ends, including an attachment at one end, the attachment characterized as Sun TECT Sensor, wherein the Sun TECT Sensor further comprising an IR (infrared) window at one end, a infrared photo transistor at the other end and a connecting control circuit including an automatic ON/OFF mechanism;

positioning the infrared photo transistor at a preset distance from the IR window;

positioning the sun detection sensor assembly away from the viewing lens of the thermal imaging microbolometer device;

monitoring the exposure to the direct sunlight with the corresponding phototransistor having a infrared photo transistor associated with Sun TECT Sensor for detecting an infrared frequency of about 940 nm;

converting the direct sunlight into a signal that activates the ON/OFF microbolometer sensor mechanism; and turning the thermal imaging device ON and OFF upon receiving a signal from the infrared photo transistor.

12. The method of protecting critical components according to claim 11, wherein the providing step further comprising by removably attaching the Sun TECT Sensor at one end of the sun detection sensor assembly.

13. The method of protecting critical components according to claim 11, wherein the activating step further comprises energizing the connected control circuit.

14. The method of protecting critical components according to claim 11, wherein the activating step further comprising activating the automatic ON/OFF mechanism for turning the thermal imaging device ON and OFF.

15. In combination, a sun detection sensor assembly and a thermal imaging microbolometer device comprising:

an elongated tubular body having two ends and a sensor, characterized as Sun TECT sensor, attached to one end;

the Sun TECT sensor having a tubular body, an IR window positioned at one end of the tubular body, and an infrared photo transistor positioned within the tubular body, opposite the IR window;

the infrared photo transistor having a photo sensitive surface for detecting the exposure from sun when the sun in within a field of view of the Sun TECT Sensor and comprises an electrical circuitry connected to a pair of electrical conductors extending from the back of the housing of the infrared phototransistor; and an automatic ON/OFF mechanism which is activated by the infrared photo transistor;

whereby the infrared photo transistor which is located at a preset distance from the IR window within the tubular body of the Sun TECT Sensor, wherein exposure to direct sunlight of infrared wavelength of about 940 nm on the surface of the infrared photo transistor converts the direct sunlight into a signal that activated the ON/OFF microbolometer sensor mechanism and turns the thermal imaging device ON and OFF thereby protecting the thermal imaging device from undesired and harmful radiation.

\* \* \* \* \*